United States Patent [19]

Heinrich

[11] Patent Number: 4,849,870
[45] Date of Patent: Jul. 18, 1989

[54] METHOD OF OPERATING A-C DRIVE WITH PARALLEL CONNECTED D-C LINK POWER CONVERTERS

[75] Inventor: Theodore M. Heinrich, Murrysville, Pa.

[73] Assignee: Westinghouse Electric Corp., Pittsburgh, Pa.

[21] Appl. No.: 147,404

[22] Filed: Jan. 25, 1988

[51] Int. Cl.[4] .............................................. H02M 5/45
[52] U.S. Cl. ......................................... 363/37; 307/3; 307/82; 363/40; 363/65
[58] Field of Search ................ 307/3, 82; 363/35, 37, 363/40, 65, 71

[56] References Cited

U.S. PATENT DOCUMENTS

| 4,084,220 | 4/1978 | Amagmaki | 363/37 |
|---|---|---|---|
| 4,349,772 | 9/1482 | Weiss | 363/65 |
| 4,392,099 | 7/1983 | Kuniyoshi | 363/65 |
| 4,426,611 | 1/1984 | Espelage et al. | 363/65 |
| 4,553,197 | 11/1985 | Stammler | 363/37 |
| 4,587,474 | 5/1986 | Espelage et al. | 318/709 |
| 4,695,933 | 9/1987 | Nguyen et al. | 363/40 |
| 4,698,739 | 10/1987 | Paice | 363/71 |

OTHER PUBLICATIONS

A New Traction System VIA Self-Controlled Synchronous Motors for Electric Locomotives by A. Cossie et al., PCI '18 Proceedings 417-434 and 436.

Primary Examiner—Patrick R. Salce
Assistant Examiner—Jeffrey Sterrett
Attorney, Agent, or Firm—D. Schron

[57] ABSTRACT

An a-c drive having a plurality of parallel connected polyphase d-c link power converters is operated in currents and with the alternating output currents contributed by the respective power converters phase shifted by an amount which reduces selected harmonics in the composite output current.

6 Claims, 3 Drawing Sheets

METHOD OF OPERATING A-C DRIVE WITH PARALLEL CONNECTED D-C LINK POWER CONVERTERS

BACKGROUND OF INVENTION

1. Field of the Invention

This invention is directed to a method of operating in the load commutated mode an a-c drive comprising parallel connected polyphase d-c link power converters. More particularly, it is directed to firing load commutated controlled rectifier switches in polyphase output inverters of the power converters in a sequence which generates from constant d-c link currents in the power converters, polyphase, alternating load currents from each inverter which are phase shifted relative to one another by an amount which reduces selected harmonics in the composite load current.

2. Background Information

Variable speed a-c drives of the load commutated inverter (LCI) type utilize a d-c link power converter to convert line current of a given frequency to a load current of a controlled, variable frequency. Such a power converter includes an inverter to generate the load current of variable frequency from the d-c current generated by a line side rectifier. Typically, these inverters employ thyristors to gate portions of the d-c current to the load. Switches such as thyristors can not be turned off from the control electrode, but must be commutated by other means.

The LCI type drive is used with an over excited synchronous motor which presents a leading power factor to the inverter thyristors to allow the thyristors to operate as naturally commutated switches. In other words, the motor load commutates the switches. At standstill or very low speeds, however, the motor voltages are insufficient to effect this commutation and other means must be utilized. A solution to this problem has been to operate the power converter in a "pulsed mode" where the d-c link current is periodically forced to zero by the line side converter to allow the motor side inverter thyristors to commutate. The pulse mode forces the current to be square in nature, with significant fifth and seventh harmonic components, which in turn give rise to strong torque pulsations at six times the line frequency and harmonics thereof for a three-phase drive.

U.S. Pat. No. 4,084,220 is directed to an a-c drive designed to reduce these torque pulsations at low fundamental load frequencies. It calls for two d-c link power converters connected in parallel. Shaped d-c pulses are generated in the respective d-c circuits of the two converters. The shaped d-c pulse signals are phase shifted such that the resultant current gated to the load by the two load side inverters of the converters more closely approximates a sine-wave than a square wave. This system requires that the repetition rate of the pulsed d-c signal be three times the fundamental frequency of the load current. As a result, it is only suitable for reducing torque pulsation at low frequencies. As frequency increases, the thyristors can not be switched rapidly enough to maintain a repetition rate of the pulsed d-c which is three times that of the fundamental load frequency.

Hence the dual power converters of U.S. Pat. No. 4,084,220, like systems with a single power converter, are operated in the load commutated mode with constant d-c link currents at higher load frequencies, typically above about 12 Hz or so. With constant d-c link currents in the converters, the load currents generated by the output inverters are square in nature with the attendant problems discussed above. In accordance with the teachings of U.S. Pat. No. 4,084,220, the switches of the output inverters of the dual converters are operated in parallel in the load commutated mode so that the same square waves and torque pulsations are generated with the dual converters as with a single power converter.

It is the primary object of the invention to provide a method for operating an a-c drive having multiple power converters connected in parallel in a load commutated mode with reduced torque pulsations.

It is another object of the invention to provide such a method which permits reduction of selected harmonics in the load current.

It is also an object of the invention to satisfy the above objects in a simple, cost effective manner.

It is an additional object of the invention to satisfy the above objects without sacrificing the advantageous low speed operation achieved by the dual converter arrangement.

SUMMARY OF THE INVENTION

These and other objects are realized by the invention which is directed to operating an a-c drive comprising a plurality of parallel connected, polyphase, d-c link power converters to reduce torque pulsations in the load commutated mode, by operating the power converters with constant d-c link currents, and cyclically firing the switches in the polyphase output inverters of the converters so as to generate alternating load currents from the respective inverters which are phased shifted with respect to one another by an amount which reduces at least a selected harmonic in the composite load current.

In the preferred form of the invention the switches in the output inverters of dual, parallel connected converters are cyclically fired to generate load currents which are phase shifted 30 degrees with respect to one another to substantially reduce both the 5th and 7th harmonics in the composite load current. Alternatively, for instance, the controlled rectifier switches of the output inverter of one power converter can be shifted 36 degrees with respect to the other to completely eliminate the fifth harmonic in the composite load current, although this would result in an increase in the magnitude of the seventh harmonic.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to an a-c drive utilizing a pair of parallel connected, three phase, d-c link power converters, although it will become apparent to those skilled in the art that the principles of the invention are applicable to a-c drives comprising any number of parallel connected, polyphase, d-c link power converters.

Figure 1:
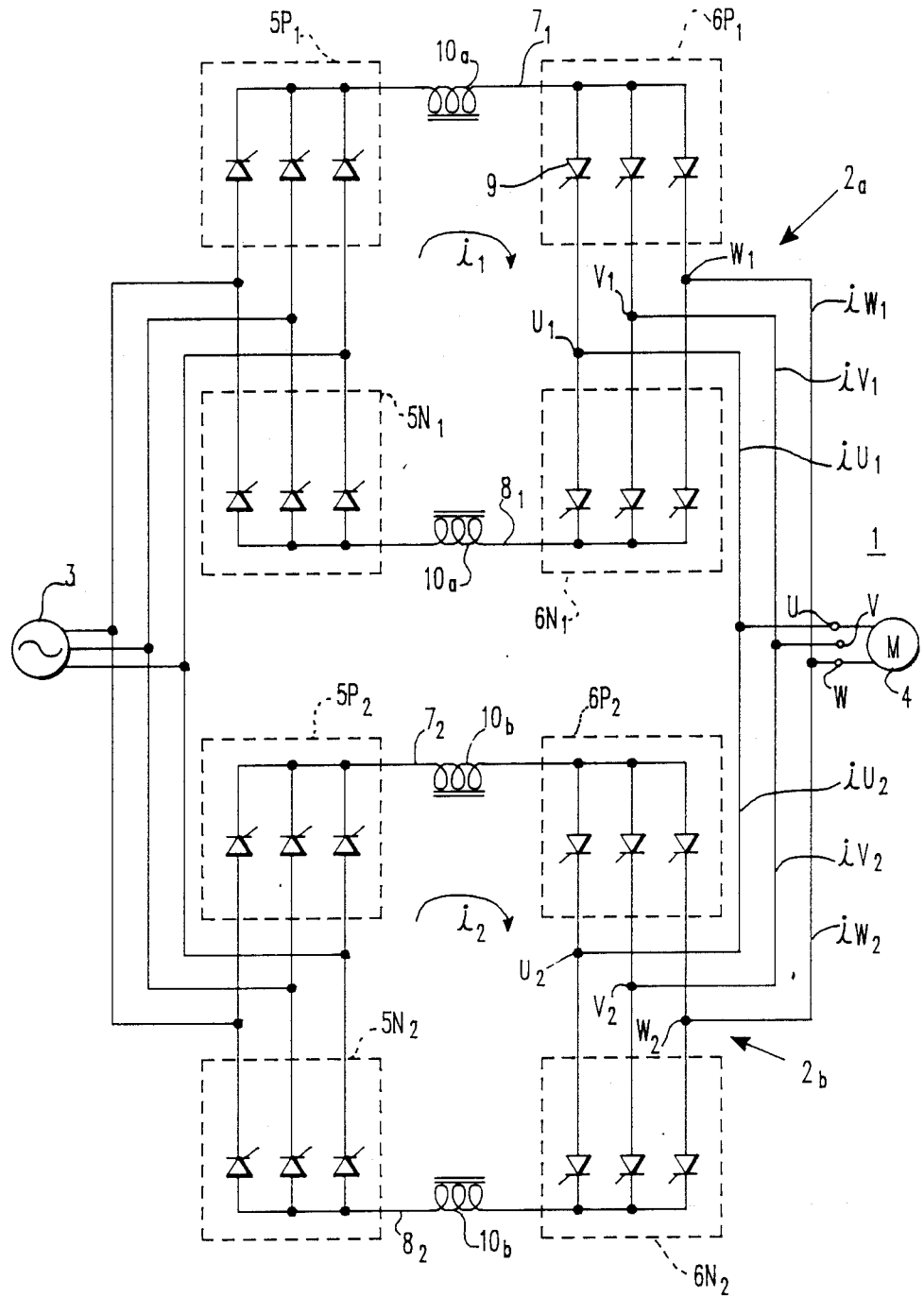
FIG. 1 is a schematic diagram of an a-c drive incorporating a pair of parallel connected, d-c link power converters to which the invention is applied.

As shown in FIG. 1, the a-c drive 1 to which the invention is applied includes two, three-phase d-c link power converters 2a and 2b. The dual power converters 2 are connected in parallel between a three-phase a-c power supply 3 and a three-phase load 4, such as a synchronous motor.

Each d-c link power converter 2 includes a pair of line side converters, one positive $5P_1$, $5P_2$ and one negative $5N_1$, $5N_2$, a positive load side converter $6P_1$, $6P_2$ and a negative load side converter $6N_1$, $6N_2$. The positive line side and load side converters, and similarly the negative line side and load side converters of each power converter 2 are linked by leads 7 and 8 respectively through which d-c current circulates. Each of the converters 5 and 6 includes a contolled recitifier switch 9 for each phase of the a-c current. Preferably, these switches 9 are thyristors, although thyratrons or ignitrons, for example, could be used alternatively where load demands permit. Although single switches 9 are shown, two or more such switches may be used in series for each switch 9 shown in FIG. 1 for driving large loads where higher voltages are required.

The line side converters 5 provide full wave rectification of the three-phase line current when the motor 4 is being driven. Their switches 9 are cyclically fired to generate d-c link currents $i_l$, and $i_2$ in the power converters 2. Reactors 10a and 10b in the respective leads 7 and 8 filter ripple in these d-c link currents.

The switches 9 of the load side converters 6 of the power converter 2 are cyclically fired to generate load currents of a desired frequency to control the speed of the synchronous motor 4. Thus, the constant frequency line current is converted to a variable frequency load current to control motor speed.

The a-c drive shown in FIG. 1 is subtantially the drive disclosed in U.S. Pat. No. 4,084,220. As load frequency is increased, the switches of the power converters cannot be operated rapidly enough to produce the desired waveforms. When this speed is reached or the counter electromotive force (CEMF) generated by the motor is sufficient, the switches 9 of the line side converters are operated to generate substantially constant d-c link currents within the power converters, and the switches 9 of the load side converters are commutated by the (CEMF) of the load motor 4. In this load commutated mode of operation, the switches of the load side converters of each of the power converters 2 in U.S. Pat. No. 4,084,220 are cyclically fired in parallel so that identical in-phase six-pulse square wave output currents are generated. Such six-pulse currents, as has been noted, generate torque pulsations due to the undesirably large current harmonics, especially fifth and seventh harmonics.

In accordance with the invention, the switches 9 of the load side converters 6 of the two parallel connected power converters 2 are not operated in parallel. Instead, the firing of the switches of the load side converters of one of the power converters is advanced with respect to the firing of the switches in the load side converters of the other power converter. By way of example, the converter switches of one of the power converters can be gated with a 30 degree advance in the firing signals, which of course, provides a 30 degree phase lead to its contribution to the motor current.

Figure 2:
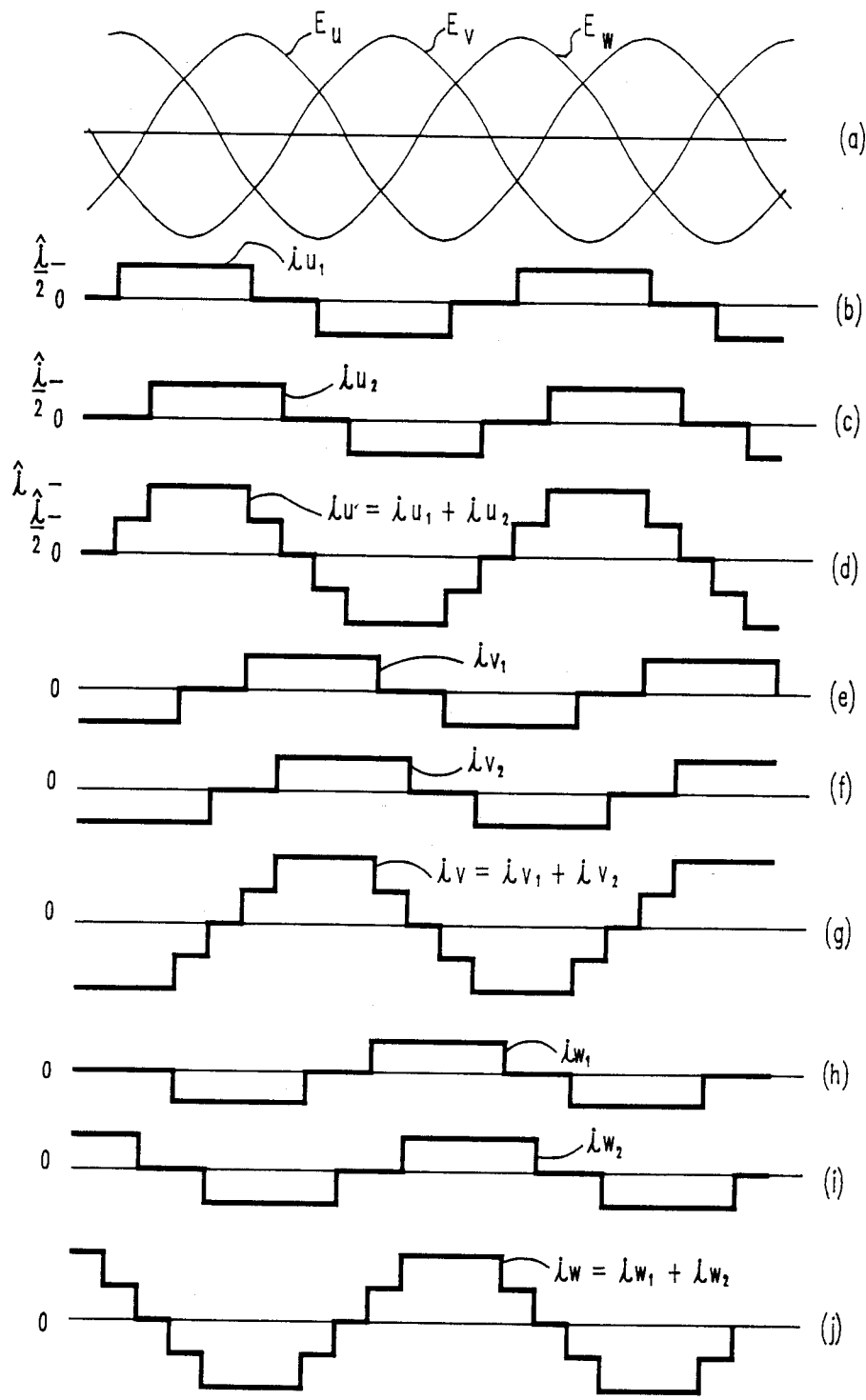
FIGS. 2a–j are waveform diagrams illustrating operation of the a-c drive of FIG. 1 in accordance with the invention.

FIG. 2 illustrates the resultant waveforms for such a 30 degree phase shift between the firing angles of the inverter switches in the two power converters 2 of FIG. 1.

FIG. 2a illustrates the ideal sine-wave three-phase load voltages $E_u$, $E_v$ and $E_w$ FIG. 2b represents the component $i_{u1}$ of the alternating load current produced by the load side converters $6P_1$ and $6N_1$ at terminal $U_1$ of the power converter 2a. FIG. 2c shows the identical component alternating load current $i_{u2}$ generated at the terminal $U_2$, but advanced by a phase angle of 30 degrees with respect to the current $i_{u1}$ FIG. 2d illustrates the U phase composite load current $i_u = i_{u1} + i_{u2}$. As can be seen from FIGS. 2a and d, this composite load current leads the idealized load voltage for phase U by about 45 degrees in the exemplary drive.

FIGS. 2 e, f and g illustrate the contributions of the two power converters to the V phase current $i_v$ applied to the motor 4 at terminal V, and similarly, FIGS. 2h, i and j show the corresponding currents for the current $U_w$ applied to the motor through the W terminal.

The waveforms shown in FIG. 2 are ideal, assuming no source inductance which is not the case in practice. The addition of source inductance causes commutation overlap which reduces the magnitude of the low-order harmonics slightly but this does not substantially affect the following.

For a 30 degree phase shift between the contributions to the total load current provided by each of the two power converters, the current, i(t), for each phase as a function of time, t, may be shown to be as follows:

$$i(t) = \left(\frac{2\sqrt{3} \cos 15 i}{\pi}\right)\left[\sin\omega t - \left(\frac{\cos 75}{5 \cos 15}\right)\sin 5\omega t + \left(\frac{\cos 75}{7 \cos 15}\right)\sin 7\omega t - \frac{1}{11}\sin 11\omega t - \frac{1}{13}\sin 13\omega t \ldots = \frac{2i}{\pi}\sum_{n=1,3,5\ldots}\frac{\cos n\, 30}{n}\{\sin[n(\omega t + 15)] + \sin[n(\omega t - 15)]\}\right.$$

where i is the peak value of the combined current as shown in FIG. 2., and $\omega = 2\pi$(frequency). Utilizing this formula, it may be shown that with ideal waveforms and a 30 degree phase shift in the load current contributions of the two power converters, the fifth and seventh harmonics of the total load current are reduced by the amounts set forth in Table I.

TABLE I

TABULATION OF RELATIVE HARMONIC AMPLITUDES FOR A SIX STEP CURRENT AND A PSEUDO TWELVE PULSE CURRENT

| HARMONIC ORDER | PER-UNIT AMPLITUDE OF UNMODIFIED SIX-STEP WAVE × 100 | PER-UNIT AMPLITUDE OF PSEUDO TWELVE-PULSE WAVE × 100 |
|---|---|---|
| 5 | 20.0 | 5.3 |
| 7 | 14.3 | 3.8 |
| 11 | 9.1 | 9.1 |
| 13 | 7.7 | 7.7 |

TABLE I-continued

TABULATION OF RELATIVE HARMONIC AMPLITUDES FOR A SIX STEP CURRENT AND A PSEUDO TWELVE PULSE CURRENT

| HARMONIC ORDER | PER-UNIT AMPLITUDE OF UNMODIFIED SIX-STEP WAVE × 100 | PER-UNIT AMPLITUDE OF PSEUDO TWELVE-PULSE WAVE × 100 |
| --- | --- | --- |
| 17 | 5.9 | 1.6 |
| 19 | 5.3 | 1.4 |
| 23 | 4.4 | 4.4 |
| 25 | 4.0 | 4.0 |
| 29 | 3.5 | 0.9 |
| 31 | 3.2 | 0.9 |

While the improvements in the harmonic content of the total current are not dramatic they are significant.

The penalties paid for this improvement in the motor excitation waveform during the load commutated mode are:

(1) A slight increase in complexity, which is entirely insignificant to the cost of the drive.

(2) A reduction of the drive output current due to the vector addition rather than the scalar addition of the two converter currents.

(3) A further reduction of the drive power because the motor must be operated at a more leading power factor, again due to the vector summation.

Of course, when necessary, the load side converter switches could be gated in parallel again at the highest speeds to overcome penalties (2) and 3 above. Clearly, the torque pulsations would not be suppressed in that case.

Figure 3:
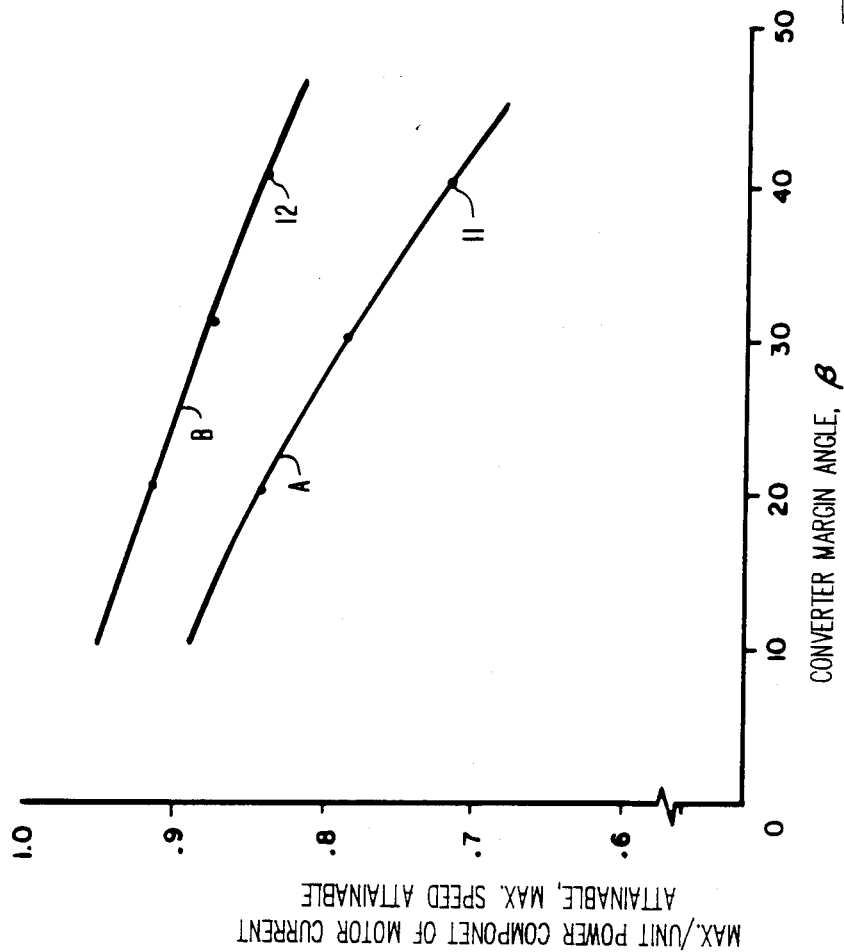
FIG. 3 is a plot illustrating the constraints on maximum speed and power imposed by operation of a fan load in accordance with the invention.

The above penalties, however, are not severe with a fan or propeller type load with a torque proportional to speed-squared. FIG. 3 shows the maximum speed and maximum power at which the control technique of the invention could be employed without oversizing the motor or the power converters. $\beta$ is the margin angle for firing the load converter thyristors. The angle $\beta$ is defined as $180-\alpha$, where $\alpha$ is the phase angle delay of firing the thyristors. FIG. 3 has been normalized to $\beta$ for operation of the two converters in parallel so that the curves depicted indicate the reduction in maximum speed and maximum power attainable with a phase angle of 30 degrees between the currents generated by the two power converters.

Trace A of FIG. 3 represents the maximum power producing component of current available at various converter margin angles with the inverter switches of one power converter advanced 30 degrees with respect to the firing angles of the inverter in the other converter as a function of $\beta$. This maximum power component of current is determined as follows:

$$I\text{MAX POWER } (P_{max}) = \frac{\text{COS }(15)(\text{COS }\beta + 15)}{\text{COS }\beta}$$

Trace B of FIG. 3 depicts the maximum speed attainable under the same conditions and is calculated as follows:

$$\text{Max Speed} = \sqrt{P \text{ max}}$$

By way of example, with a converter margin angle of 40 degrees, the I maximum power available is 72.3% of that available if the power converters were operated in parallel as indicated at point 11, and the maximum speed is 85.0% of that attainable without the invention as indicated at point 12.

As can be seen, the penalties increase with increasing converter margin angles, but again, the thyristors of the two converters can be fired in parallel when greater speed or power is required.

While the preferred shift in the firing angles of the controlled rectifiers in the dual output inverters is 30 degrees because this staggering of the component load currents substantially reduces the magnitude of both the fifth and seventh harmonics, the harmonics of greatest magnitude in the six-pulse composite load current, other phase shifts can be used. For instance, by advancing the firing angles of one output inverter 36 degrees with respect to the other, the fifth harmonic can be completely eliminated. This does, however, result in somewhat of an increase in the magnitude of the seventh harmonic. Also, with more than two power converters, the shift in the firing angles between successive converters does not have to be equal nor do the magnitudes of the d-c link currents have to be the same. The phase shift and magnitude of each power converter channel may be controlled independently.

The combination of the controlled rectifier switches in the load side converters of the power converters are pulsed 12 times per cycle of the motor frequency when operated in accordance with the invention. This does not produce true twelve-pulse operation, since as indicated above harmonics remain in the composite load current, however, it can be identified as psuedo twelve-pulse operation in view of the firing rate of the inverter switches and the substantial reduction in motor current harmonics.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of operating an a-c drive comprising a plurality of parallel connected polyphase d-c link power converters having load side, converters with controlled rectifier switches which are cyclically fired to generate component alternating load currents which are summed by a direct parallel connection without isolation of said power converters to produce a composite load current, said method comprising:
   operating said d-c link power converters to generate substantially constant d-c link currents; and
   cyclically firing the controlled rectifier switches in said load side converters of the respective power converters at a repetition rate which effects load commutation between said controlled rectifier switches and with the firing of said controlled rectifier switches within each load side converter phase shifted with respect to the firing of the controlled rectifier switches in the other load side converters to generate from said substantially constant d-c link currents, component alternating load currents which are phase shifted by an amount which reduces the magnitude of selected harmonics in the composite load current produced through the direct parallel connection without isolation of said power converters.

2. The method of claim 1 wherein said polyphase d-c link power converters are three-phase with two three-phase load side converters and wherein said controller rectifier switches in the load side converters are cyclically fired with a phase shift of 36 degrees with respect to the firing of the controlled rectifier switches in the other of said load side converters to generate component alternating load currents from the respective load side converters which are phase shifted about 36 degrees with respect to one another and are summed by the direct parallel connection without isolation of said power converters to produce a pseudo 12-pulse composite load current.

3. The method of claim 1 wherein said polyphase d-c link power converters are three-phase with two three-phase load side converters and wherein said controlled rectifier switches in one of said load side converters are cyclically fired with a phase shift of 30 degrees with respect to the firing of the controlled rectifier switches in the other of said load side converters to generate component three-phase alternating load currents from the respective load side converters which are phase shifted about 30 degrees with respect to one another and are summed by the direct parallel connection without isolation of said power converters to produce a pseudo 12-pulse composite load current.

4. A method of operating in a load commutated mode an a-c drive comprising a pair of directly parallel connected without isolation, three-phase, d-c link power converters, each having load commutated controlled rectifier switches in a three-phase output inverter, said method comprising the steps of:

operating aid d-c link power converters to generate essentially constant d-c link current; and
cyclically firing said load commutated controlled rectifier switches in one of said output inverters phase shifted with respect to the firing of the controlled rectifier switches in the other output inverter to generate three-phase component load currents from each power converter which component load currents are summed by said directly parallel connected without isolation power converters to generate a composite pseudo twelve-pulse three-phase load current, and which three-phase component load currents are phase shifted with respect to one another by a phase angle which reduces the magnitude of at least a selected harmonic in said composite pseudo twelve-pulse three-phase load current.

5. The method of claim 4 wherein said step of cyclically firing said load commutated controlled rectifier switches includes cyclically firing said switches in one output inverter with a 36 degree phase shift with respect to the firing of said switches in the other inverter to generate three=phase component load currents from the two power converters which are phase shifted about 36 degrees with respect to the one another and which are summed by the directly parallel connected without isolation power converters to generate said composite pseudo twelve-pulse load current.

6. The method of claim 4 wherein said step of cyclically firing said load commutated controlled rectifier switches includes cyclically firing said switches in one output inverter with a 30 degree phase shift with respect to the firing of said switches in the other inverter to generate three-phase component load currents from the two power converters which are phase shifted by about 30 degrees with respect to one another and which are summed by the directly parallel connected without isolation power converters to generate said composite pseudo twelve-pulse load current.

* * * * *